(12) United States Patent
Herzig

(10) Patent No.: US 7,742,897 B2
(45) Date of Patent: Jun. 22, 2010

(54) SYSTEMS AND METHODS FOR MONITORING AND DIAGNOSING THE POWER GENERATED BY RENEWABLE POWER SYSTEMS

(76) Inventor: Michael Herzig, 2787 Route 9, Cold Spring, NY (US) 10516

(*) Notice: Subject to any disclaimer, the term of this patent is extended or adjusted under 35 U.S.C. 154(b) by 246 days.

(21) Appl. No.: 11/949,035

(22) Filed: Dec. 2, 2007

(65) Prior Publication Data
US 2009/0144000 A1  Jun. 4, 2009

(51) Int. Cl.
*G06F 11/30* (2006.01)
(52) U.S. Cl. ...................................... 702/182
(58) Field of Classification Search ............. 702/60–68, 702/182, 183, 189, 33
See application file for complete search history.

(56) References Cited

U.S. PATENT DOCUMENTS

| 4,280,061 | A  | * | 7/1981  | Lawson-Tancred ......... 290/55 |
| 6,311,137 | B1 |   | 10/2001 | Kurokami et al. |
| 7,133,787 | B2 |   | 11/2006 | Mizumaki |
| 2002/0033020 | A1 |   | 3/2002 | Tonomura |
| 2004/0103056 | A1 |   | 5/2004 | Ikeda |
| 2004/0138977 | A1 |   | 7/2004 | Tomkins |
| 2004/0177027 | A1 |   | 9/2004 | Adachi |
| 2004/0230377 | A1 | * | 11/2004 | Ghosh et al. ................... 702/3 |
| 2006/0271214 | A1 |   | 11/2006 | Brown |
| 2007/0162367 | A1 |   | 7/2007 | Smith et al. |
| 2008/0091625 | A1 |   | 4/2008 | Kremen |
| 2008/0215500 | A1 |   | 9/2008 | De La Motte |

FOREIGN PATENT DOCUMENTS

WO   WO 0225987 A2    3/2002
WO   WO 2006119113 A2  11/2006

* cited by examiner

*Primary Examiner*—Drew A Dunn
*Assistant Examiner*—Stephen J Cherry
(74) *Attorney, Agent, or Firm*—Jennifer Meredith; Meredith & Keyhani, PLLC

(57) ABSTRACT

A method of measuring, monitoring and comparing power generation of at least two renewable power systems, comprising the steps of; providing at least two renewable power systems, at least one data server, at least one generation monitoring device in communication with at least one at premise renewable power system and at least one communication node in communication with at least one of renewable power system, generation monitoring device and data server, determining at least one diagnostic variable for each renewable power system and saving in the data server; determining at least one system coefficient for each renewable power system and saving in the data server; determining the energy generated by each renewable power system; wherein the data server determines comparative information based upon at least one of: background constant, diagnostic variable, system coefficient and energy generated to determine a comparative value of the renewable power system.

6 Claims, 4 Drawing Sheets

Comparison Calculations

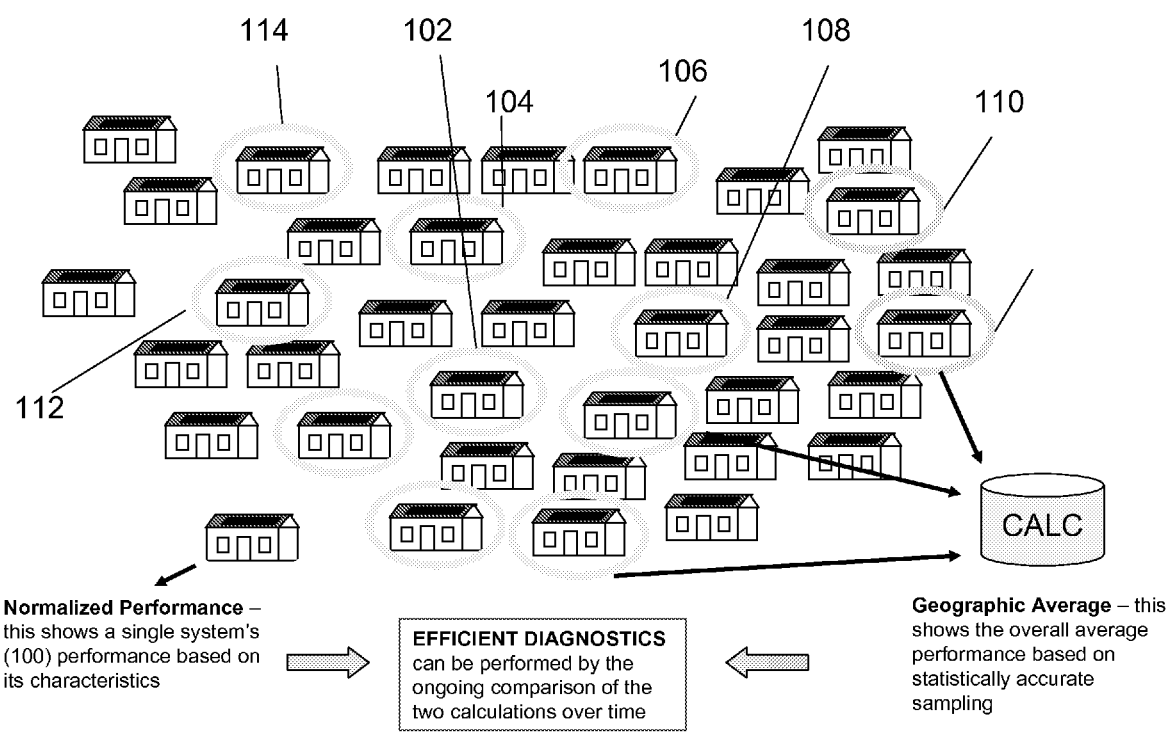
Figure 1- Comparison Calculations

Figure 2 - Potential Components
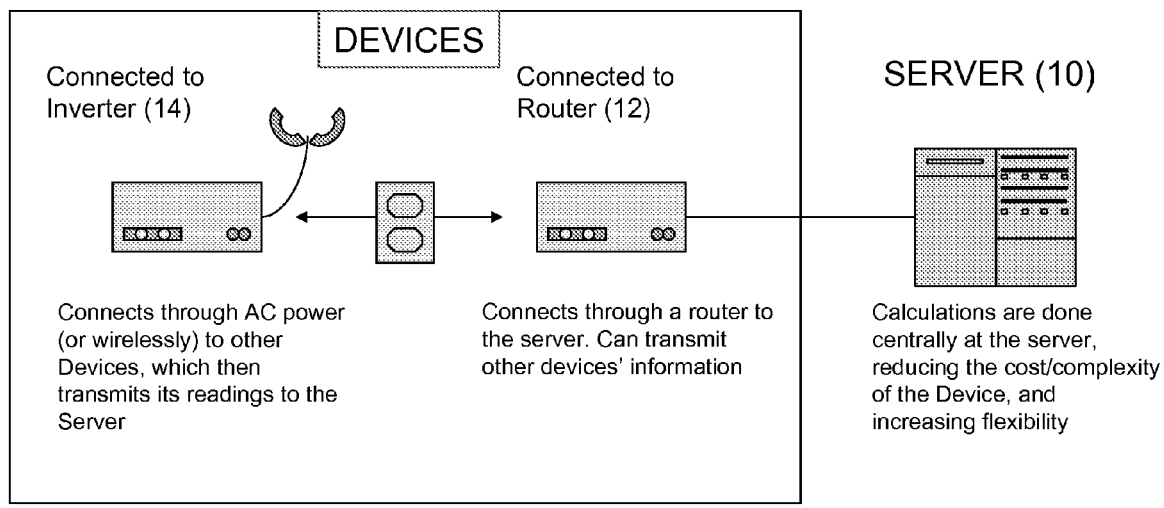

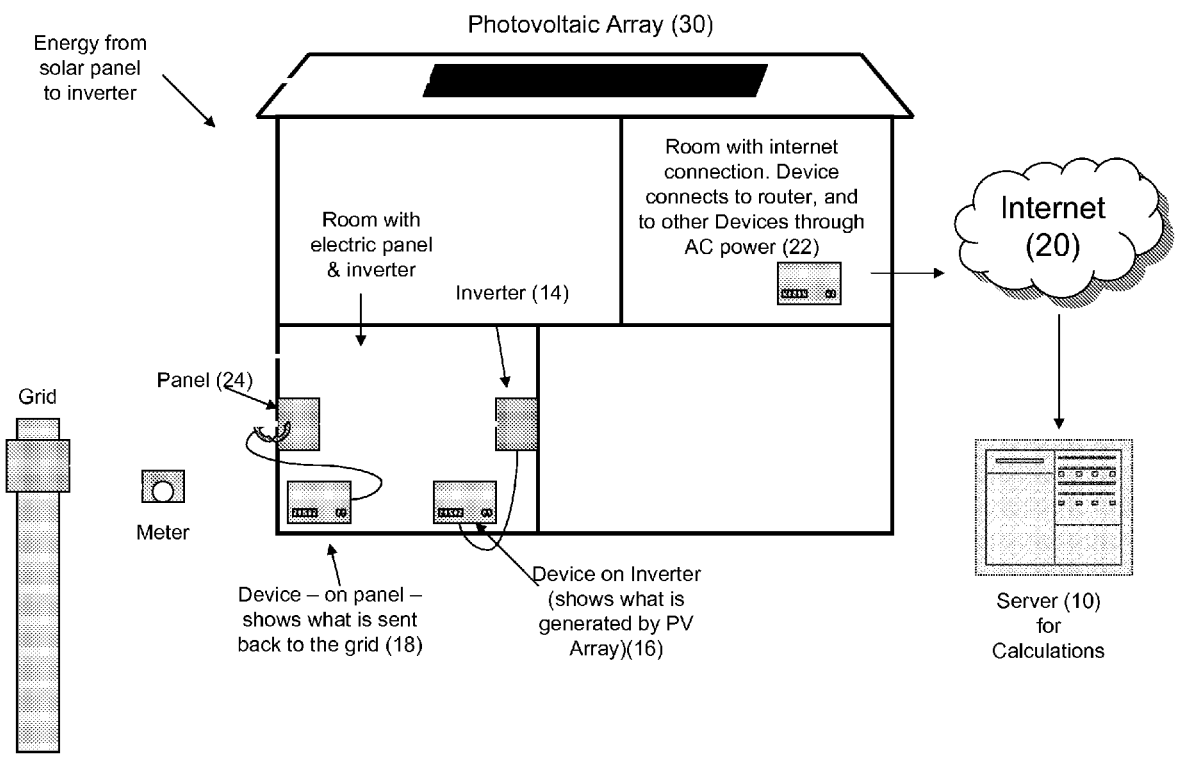
Figure 3- Sample PV Configuration

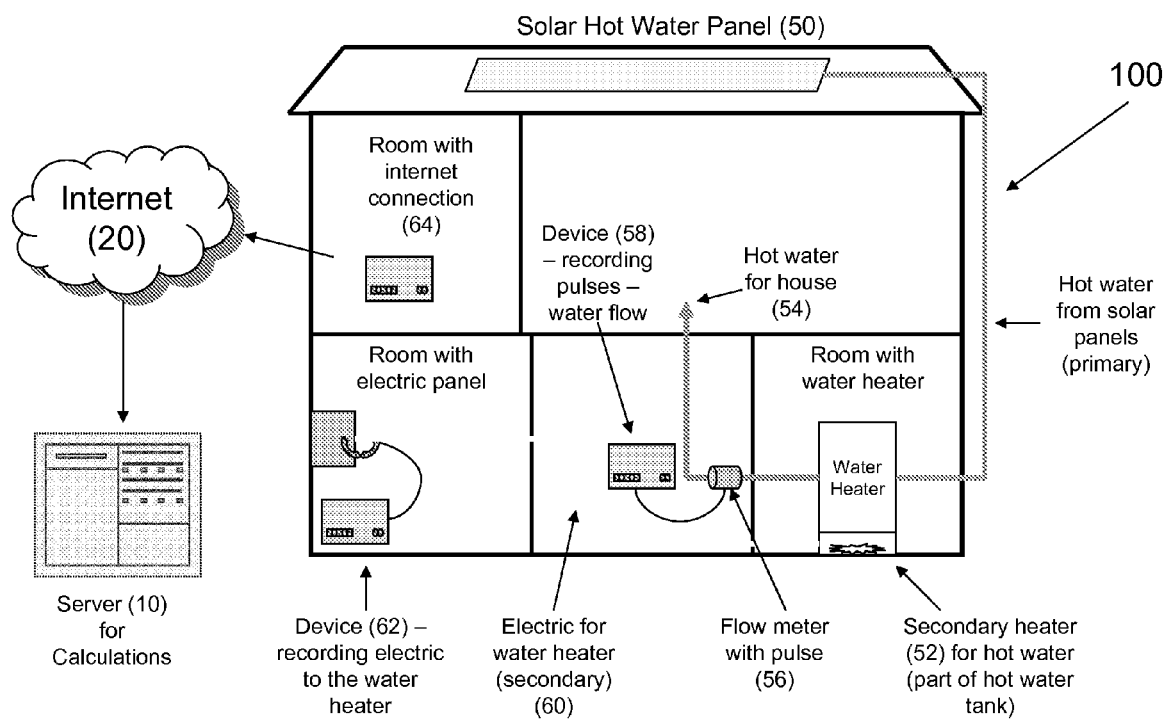

SYSTEMS AND METHODS FOR MONITORING AND DIAGNOSING THE POWER GENERATED BY RENEWABLE POWER SYSTEMS

The present invention relates to systems and methods for measuring and diagnosing the power generated by renewable power systems.

As the field of renewable power/renewable energy systems grows, monitoring the performance and output of these systems on an ongoing basis becomes more important for the following reasons: 1) it helps quantify to the system owner the exact benefits of the system; 2) it validates the systems economic payback; 3) it informs the system owner or service provider of issues so that they can be resolved quickly, reducing wasted generation capacity; and 4) it provides data which over time can be used to improve renewable energy system design and performance.

Monitoring is becoming even more important as new solar technologies are introduced to the market. Today, most installed Photovoltaic solar arrays rely on poly silicon cells to generate electricity. These are encased in glass and are extremely durable, though expensive. Many new technologies will soon be on the market, some of which are printed on thin films and do not use silicon at all as a conductor. While these technologies are much less expensive and will greatly aid in the spread and adoption of solar power, their long-term efficiency and durability are less well known. Therefore, ongoing monitoring is critical to both deploying and supporting these systems.

There are many factors which impact the generation from a solar renewable energy system, including shading, dust and dirt, wind/temperature, module degradation and inverter efficiency. Each factor can impact the system by over 10%, sometimes affecting output as much as 100%. It is fairly easy to see that while each factor can impact the system, some are broadly environmental and cannot be remedied (e.g. temperature), others are local and can be fixed relatively easily (e.g. dirt or shade) and some are system related and may need to be fixed immediately (e.g. the inverter).

While all of these measurements are important, they do not always do a sufficient job of quickly informing the system owner or service provider of a problem with the system. The reason they do an incomplete job is that none provides an inexpensive and reliable means of 1) truly knowing that a problem resides within a particular system (vs. being an environmental factor), and 2) diagnosing the magnitude of the problem. The reason for this is because many factors affect the performance of solar energy systems (both Photovoltaic and Solar Hot Water), and it is very difficult to efficiently determine the specific issue remotely. For example, a system may be performing below expectation because of excessive wind or cloudiness, but this does not imply any fundamental system issue and does not warrant a service visit. On the other hand, the system may be underperforming because of growth of nearby trees or a thin film of dirt on the panels, which are easy to remediate by either the owner or a service provider.

Another example of an important but potentially faulty environmental measurement system is a locally placed sunlight metering device. If this produces readings which differ from the expected output of the solar panels, it will highlight an issue. But if both are dirty due to the same ongoing dust from a local construction site, the issue will not be known.

It cannot be overstated how important it is that renewable energy solar systems perform as close to optimally as possible. A system which produces electricity valued at $3,000 per year, which has a 10% degradation that can easily be fixed (e.g. through cleaning) loses $300 per year. Given the 25+ year life of the system (and without accounting for inflation in the value of electricity), this translates into a loss of $7,500 worth of generation, as well as the additional cost of the $7,500 (or more) the user must pay for power to replace the lost generation. The present invention provides an efficient solution to many of these potential losses through Comparative Diagnostics, as opposed to potentially costly and complex sensors.

These and other features, aspects and advantages of the present invention will become better understood with reference to the following description and claims.

SUMMARY OF THE INVENTION

The present invention relates generally to systems and methods for measuring, monitoring, comparing and diagnosing the power generated by at least two renewable power systems provided to a consumer.

According to one embodiment of the present invention, the method may be comprising the steps of; providing at least two renewable power systems, at least one data server, at least one generation monitoring device in communication with at least one at premise renewable power system and at least one communication node in communication with at least one of: renewable power system, generation monitoring device and data server, determining at least one diagnostic variable for each renewable power system and saving each diagnostic variable into the data server; determining at least one system coefficient for each renewable power system and saving each system coefficient into the data server; determining the energy generated by each renewable power system; wherein the data server determines comparative information based upon at least one of: diagnostic variable, system coefficient, background constant and energy generated to determine a comparative value of the renewable power system.

According to another embodiment of the present invention, a system for measuring, monitoring, comparing and diagnosing the power generated from at least two renewable power systems as it is generated at a consumer's premises is provided, the system comprising: at least two renewable power systems, wherein each renewable power system is at least partially powered by at least one alternate energy source; at least one generation monitoring device, wherein each generation monitoring device calculates the energy generated at each consumer's premises by the renewable power system; at least one communication node in communication with each generation monitoring device; at least one data server in communication with each communication node, wherein each data server accepts information from the communication node to determine the power generated at a first user's premises and compares the power generated at a first user's premises to comparative information obtained from at least two renewable power systems to determine if the first user's renewable power system is within a predetermined deviation from the comparative information.

These and other features, aspects and advantages of the present invention will become better understood with reference to the following description and claims.

BRIEF DESCRIPTION OF THE DRAWINGS

FIG. 1 depicts the present invention;
FIG. 2 depicts the present invention;
FIG. 3 depicts the present invention; and
FIG. 4 depicts the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a method, software applications and formulas to gather data on different renewable energy systems within a geographic area, and to use this data from the different systems to efficiently derive important Comparative Diagnostic information on each of the systems on an ongoing basis. This diagnostic information can be used to detect and report system issues. Specifically, the Invention does this by assigning individual System Coefficients to each renewable energy system (for example, a solar photovoltaic system) when they are set up. These System Coefficients contain important characteristics such as expected generation for the system, expected sunlight for the specific location, impacting features such as roof pitch, building orientation, etc. Then, on an ongoing basis, the Invention utilizes a data gathering/processing infrastructure to calculate individual Normalized Performances for each renewable energy system, and then combines these to create a statistically significant Geographic Average for each local area. Each individual system's Normalized Performance is then compared over set durations against the Geographic Average for the area. Since these Geographic Averages inherently control for complex environmental data, they provide accurate renewable energy system diagnostics with less expense and fewer required sensors. In addition, the present invention provides a method and a system for monitoring the diagnostics, and providing them to both the owner of the system as well as third parties who are then able to address the issues with the renewable energy systems. For example, service providers who may correct issues with the renewable energy system. The term renewable power system may be interchangeable with at premise renewable power system, renewable energy system and at premise renewable energy system. The renewable power system may be, by way of example, a solar system, solar panel system, photovoltaic, thermal, wind powered, geothermal, hydropower.

With reference to FIGS. 1-4, a computer processor implemented (e.g. server 10) method of measuring, monitoring and comparing the power generated of at least two renewable power systems (e.g. 102, 104, 106, 108, 110, 112) provided to a consumer is provided. According to a preferred embodiment, to be statically relevant at least forty (40) renewable power systems must be monitored and data acquired from the renewable power systems. The method comprising the steps of; providing at least two renewable power systems (e.g. 102, 104, 106, 108, 110, 112), at least one data server (10), at least one generation monitoring device (16) in communication with one at premise renewable power system (30) and at least one communication node (22) in communication with at least one of the renewable power system (30), the generation monitoring device (16), the data server (10). The renewable power system may have Background Constants that are entered into the system during data setup; populating this part of the data structure is one of the initial steps to the process. During this time, all required (or potentially required) background information is loaded into the system. This data will later be used for system calculations and diagnostics. Background Constants may include: (1) Full Calendar with sunrise and sunset according to latitude throughout the year; (2) Insolation or 'incident solar radiation': This is the actual amount of sunlight falling on a specific geographical location. There are expected amounts of radiation which will fall on an area each day, as well as an annual figure. Specific Insolation is calculated as kWh/m2/day. The importance of this variable is that it can combine several other Background Constants; and (3) Location Functionality. This software helps determine the proximity of each system to each other system, and forms a key part of the algorithm used to determine the Geographic Average of the renewable energy systems. While there are different specific methods of implementing Location Functionality, generally this relies on a large database of locations which are tied to zones. Because the relational distances between the zones are stored within the software, the distances between any two locations can then be easily and accurately calculated.

There may be the step of determining at least one Diagnostic Variable for each renewable power system (30). These are the variables which affect the diagnostics. Examples include: (1) Adjustments to the permitted size of each zone. When there are fewer systems within an area, the algorithm may be adjusted to allow for a statistically accurate comparison, but this would also reduce the ability of the comparison to control as well for weather, etc., since there may be more variances over the distance; (2) Adjustments to the sensitivity of the diagnostics. Changing thresholds will impact when a particular renewable energy system is identified by the software as having an issue. Each at least one Diagnostic Variable is saved into at least one data server.

The method may comprise the step of determining at least one System Coefficient for each renewable power system and saving each System Coefficient in the data server(s). These are set up when each new renewable energy system is entered into the software, and they provide key information about the expected performance of each system. The Coefficients will generally stay the same for the life of the system. Not all System Coefficients will be used in each comparative diagnostic, but they all may be used at some point to provide additional functionality to the process. One critical aspect of the System Coefficients is that ALL Coefficients for all renewable energy systems must be assigned using the same approach and rules. The reason for this is that if the System Coefficients are not uniformly applied, the Normalized Performance values (described below) will not be accurate. The items which can make up the System Coefficient include: (1) Expected generation by day, month and year for the system; (2) Expected generation on an ongoing basis (e.g. average generation each day, regardless of time of the year); (3) Renewable Energy system size; (4) System technology; (5) system tolerances (e.g. how accurate information from the system's components will be); (6) system shading; (7) system orientation; and (8) An 'Adjustment Factor' which can be entered by admin to adjust for how the system actual works to reduce 'false' signals if the system does not work as initially expected. This is represented as a percentage affecting the calculations:

The energy generated by each renewable power system is recorded and the data server then determines comparative information based upon at least one of the Background Constant, the Diagnostic Variable, the System Coefficient and the energy generated to determine a comparative value of the renewable power system. The term comparative value is intended to include any value that compares one system to another system or a group of systems. For example, this may be as simple as an "underperforming" designation when the system's performance is less than another system or group of systems performance in terms of power generated.

The Normalized Performance is then calculated. This is an ongoing calculation which is done for each renewable energy system which is connected to the software. Essentially, the Normalized Performance is a renewable energy system's actual performance for a given time period multiplied by its individual System Coefficient.

The formula for this for a given time period is:
$$NP = Gen * SC$$

This equation is fundamental to performing Comparative Information and Comparative Diagnostics since it enables the results from disparate systems to be 'normalized' and therefore directly compared. These Normalized Performance readings can then aggregated into larger periods (24 hours, 7 days, 1 month) for comparison.

The comparative information may be a 'Geographic Average'. The Geographic Average may be calculated by an algorithm which produces an average of the Normalized Performances for each area covered. The purpose is to be able to efficiently perform comparative diagnostics regularly (e.g. every 5 minutes) for a large number of areas containing a large number of renewable energy systems without overly taxing the servers' processors. The main steps of this algorithm are as follows: (1) The software will randomly select forty (40) renewable energy systems within each of the algorithm's defined localities; (2) The Normalized Performance for these forty (40) systems will be summed and then divided by forty (40); (3) This results in a statistically significant Geographic Average which will then be recorded on the database; (4) An important feature of this algorithm is that much of the complexity is dealt with at the individual renewable energy system level with the System Coefficient. The simplicity of the algorithm is important for processor efficiency and ongoing data production.

There may be a comparative diagnostics process. Once the Normalized Performance and the Geographic Average are known for a given renewable energy system, these two figures can be compared to determine how well the system is performing vis-à-vis expectations. The reason the results of this are valid regardless of time of year or environmental conditions is because these factors are all controlled for within the local sampling of related systems. Based on the factors noted above which can degrade system performance, the Comparative Diagnostics can be used to determine when a renewable energy system is performing sub optimally, therefore the comparative value may be "underperforming" or any other term indicating an issue. If the comparative value falls below certain thresholds (e.g. 7.5% below the Geographic Average signals a system issue) these diagnostics can then be used to remediate the issue and improve the system's performance. The diagnostics can be broken out into periods of different length (24 hours, 7 days and 1 month) which have the following benefits: (i) 24 Hour Comparisons: While a 5 minute segment may show variance between one renewable energy system and the group's Geographic Average, the variance may not be due to any inherent system issue (e.g. a single cloud may be temporarily affecting one system without impacting others in the vicinity). However, over a 24 hour period, these environmental factors are normally controlled for, and any significant variance will reveal a legitimate system issue. The fact that this is done over a rolling 24 hours means that the information will be received by the renewable system owner or service provider relatively quickly, without the requirement of waiting for a weekly or monthly report; (ii) Weekly Comparisons: Though this does not provide the same sort of timely information that is provided by 24 Hour Comparisons, the additional data will allow for more accurate diagnostic comparisons since environmental variables will have even less impact; (iii) Monthly Comparisons: While more accurate than Weekly Comparison, this will be used mostly as a reporting mechanism to show system status and performance.

There may be at least one inverter (14) in communication with the renewable power system (e.g. 50, 30). The inverter (14) is an electronic circuit that converts direct current (DC) to alternating current (AC). There may also be at least one return monitor (18) determining the energy returned to a grid by said at-least one renewable power system. The method may comprise the step of determining at least one background constant and saving each background constant in the data server(s).

There may also be the steps of determining if the renewable power system can be remotely adjusted and remotely making a change to the renewable power system. By way of example, it may be possible to remotely monitor the system and change the angle of a solar panel to provide increased sunlight.

The system for measuring, monitoring, comparing and diagnosing the power generated from at least two renewable power systems as it is generated at a consumer's premises may have: at least two renewable power systems, wherein each renewable power system (e.g. 30, 50) is at least partially powered by at least one alternate energy source; at least one generation monitoring device (e.g. 58), wherein the at least one generation monitoring device (e.g. 58) calculates the energy generated at each consumer's premises by the renewable power system (e.g. 30, 50); at least one communication node (64) in communication with each at least one generation monitoring device (e.g. 58); at least one data server (10) in communication with communication node (e.g. 64), wherein the data server(s) (10) accept information from the communication node (e.g. 64) to determine the power generated at a first user's premises (100) and compare the power generated at a first user's premises (100) to Comparative Information obtained from at least two renewable power systems (e.g. 102, 104, 106, 108, 110, 112, 114) to determine if the first user's renewable power system (100) is within a predetermined deviation from the Comparative Information. This may provide a Comparative Value. The communication node may be further comprising a data storage means for storing usage information. The generation monitoring device may be selected from the group consisting of pulse meter, temperature meter, electromechanical meter, solid state meter, flow meter, electric meter, energy meter and watt meter. There may also be at least one return monitoring device in communication with the inverter which calculates the energy returned to a grid by the system.

The at-premise renewable Power System may be, for example, a solar system, solar panel system, photovoltaic, thermal, wind powered, geothermal, hydropower. A secondary energy source (e.g. 52) may be in communication with and at least partially powering the renewable power system. It should be understood, though, this is only for ancillary power in the event that the renewable energy source (50) is not capable of entirely powering the at premise renewable power system.

The Generation Monitoring Device may be any type of meter, by way of example, this may include a pulse meter, temperature meter, electromechanical meter, solid state meter, flow meter, electric meter, energy meter and watt meter. Each installation of the Invention will have a communication node or hub set up at the location with the system. One of the communication nodes may act as a hub. These devices connect to the internet and send the data collected by the nodes to the Server. They have the following properties:

The hub has a web server and connects to a standard internet connection (Ethernet). It does not require a computer or other device to make this connection. Each hub has its own unique IP or DNS address. The hub is configured by a web browser. The web browser allows the hub to have specific nodes assigned to it. This set up feature will allow another hub in the area to be set up with its own nodes so that all can operate wirelessly without disruption. Also, the hub is able to configure specific aspects of the hub, such as the connection with the server, data recording and time settings and the ability to configure the attached nodes, including their recording properties.

The hub may connect wirelessly or through wire-line including through AC power to the various nodes in its network and may handle several nodes, sending up the data of each within a separate data stream to the server. Typically the hub would plug into a standard AC outlet and have LEDs to show operation and diagnostics. The hub may also record data, so that if the Internet connection is ever down, data from the nodes will not be lost. It will also have the option of a tamper resistant casing and minor router capabilities—so that it could stand in front of a standard router and act as the primary data entry point for a location. The hub will also be able to operate behind a router. All of the hubs may connect to a centralized database for data aggregation. This database will be able to relate the information from each node according to the time recorded. Specific data which will be saved may include: (1) hub IP#/DNS information; (2) node IP#/DNS information/name; (3) Timestamp increment; (4) Hot water flow by unit (gallon or liter) per time increment; (5) Electric flow by unit (kilowatts) per time increment; (6) Fuel flow by unit (depends on fuel type) per time increment; and (7) Other information as required (e.g. water temperature).

Each installation of the Invention will have typically one or more generation recording nodes. These are typically connected wirelessly to the hub, and connected directly to the inputs/outputs from the renewable power system. They communicate constantly with the various devices and transfer data which is then sent to the server. They may have the following properties: The first required node connects to a flow meter attached to the Water Tank that is connected to the Solar Hot Water system. This node will operate as a pulse meter, 'clicking' whenever a unit (either a gallon or a liter) of hot water passes from the tank. The second required node connects to either the electric panel at the switch for the Hot Water tank's electric power OR to a flow/other meter for gas/oil to the secondary heater for the Hot Water tank. The node may have a data storage means for storing flow/usage information. There may also be other nodes, which may be used to measure other aspects of the system and gain even more accurate readings. For example: the temperature of the hot water on an ongoing basis. The system may be monitored from a remote location (such as a computer in a different location).

It should be understood that the foregoing relates to preferred embodiments of the invention and that modifications may be made without departing from the spirit and scope of the invention as set forth in the following claims.

I claim:

1. A computer processor implemented method of measuring, monitoring, comparing and diagnosing the power generated of at least two renewable power systems provided to a consumer, said method comprising the steps of;
providing at least two renewable power systems, at least one data server, at least one generation monitoring device in communication with at least one said renewable power system and at least one communication node in communication with at least one of said renewable power system, said generation monitoring device and said data server,
determining at least one diagnostic variable for each said renewable power system and saving each said at least one diagnostic variable into said at least one data server;
determining at least one system coefficient for each said renewable power system and saving each said at least one system coefficient in said at least one data server;
determining the energy generated by each said renewable power system and saving said energy generated in said at least one data server;
wherein said at least one data server determines comparative information based upon at least one of a background constant, said diagnostic variable, said system coefficient and said energy generated to determine a comparative value of said renewable power system;
wherein said comparative information is a geographic average and wherein said geographic average is determined by:
randomly selecting a predetermined number of renewable power systems;
determining the normalized performance of each said renewable power systems, summing said normalized performances to provide a sum and dividing said sum by said predetermined number to provide a geographic average; and
saving said geographic average in said data server.

2. A computer processor implemented method of measuring, monitoring, comparing and diagnosing the power generated of at least two renewable power systems provided to a consumer, said method comprising the steps of;
providing at least two renewable power systems, at least one data server, at least one generation monitoring device in communication with at least one said renewable power system and at least one communication node in communication with at least one of said renewable power system, said generation monitoring device and said data server,
determining at least one diagnostic variable for each said renewable power system and saving each said at least one diagnostic variable into said at least one data server;
determining at least one system coefficient for each said renewable power system and saving each said at least one system coefficient in said at least one data server;
determining the energy generated by each said renewable power system and saving said energy generated in said at least one data server;
wherein said at least one data server determines comparative information based upon at least one of a background constant, said diagnostic variable, said system coefficient and said energy generated to determine a comparative value of said renewable power system;
wherein said comparative information is a comparative diagnostic and wherein said comparative diagnostic is determined by:
determining a geographic average performance;
comparing at least one renewable power systems performance to said geographic average performance;
alerting at least one user when said at least one renewable power systems performance is a predetermined amount lower than said geographic average performance.

3. A method as in claim 2, further comprising the steps of:
determining if said at least one renewable power system can be remotely adjusted;
remotely making a change to said at least one renewable power system.

4. A method as in claim 3, loading background constants and diagnostic variables into said data server.

5. A system for measuring, monitoring, comparing and diagnosing the power generated from at least two renewable power systems as it is generated at a consumer's premises, said system comprising:

at least two renewable power systems;

at least one generation monitoring device, wherein said at least one generation monitoring device calculates the energy generated at each said consumer's premises by said renewable power system;

at least one communication node in communication with each said at least one generation monitoring device:

at least one data server in communication with each said at least one communication node, wherein said at least one data server accepts information from at least one said communication node to determine the power generated at a first user's premises and compare said power generated at a first user's premises to comparative information obtained from at least two renewable power systems to determine if said first user's renewable power system is within a predetermined deviation from said comparative information;

wherein said comparative information is a geographic average and said geographic average is determined by:

selecting a predetermined number of at premise renewable power systems;

determining the normalized performance of each said at premise renewable power systems, summing said normalized performances to provide a sum and dividing said sum by said predetermined number to provide a geographic average; and saving said geographic average in said data server.

6. A system for measuring, monitoring, comparing and diagnosing the power generated from at least two renewable power systems as it is generated at a consumer's premises, said system comprising:

at least two renewable power systems;

at least one generation monitoring device, wherein said at least one generation monitoring device calculates the energy generated at each said consumer's premises by said renewable power system;

at least one communication node in communication with each said at least one generation monitoring device:

at least one data server in communication with each said at least one communication node, wherein said at least one data server accepts information from at least one said communication node to determine the power generated at a first user's premises and compare said power generated at a first user's premises to comparative information obtained from at least two renewable power systems to determine if said first user's renewable power system is within a predetermined deviation from said comparative information;

wherein said comparative information is a comparative diagnostic and said comparative diagnostic is determined by:

determining a geographic average performance;

comparing at least one renewable power systems performance to said geographic average performance;

alerting at least one user when said at least one renewable power systems performance is a predetermined amount lower than said geographic average performance.

* * * * *